(12) United States Patent
Pacchione

(10) Patent No.: US 10,223,937 B2
(45) Date of Patent: Mar. 5, 2019

(54) WEARABLE SPORT FISHING SYSTEM AND METHOD

(71) Applicant: Jesse Pacchione, Cary, NC (US)

(72) Inventor: Jesse Pacchione, Cary, NC (US)

( * ) Notice: Subject to any disclaimer, the term of this patent is extended or adjusted under 35 U.S.C. 154(b) by 0 days.

(21) Appl. No.: 15/336,319

(22) Filed: Oct. 27, 2016

(65) Prior Publication Data

US 2018/0122269 A1   May 3, 2018

(51) Int. Cl.
  *G09B 29/00* (2006.01)
  *G09B 5/12* (2006.01)

(52) U.S. Cl.
  CPC ........... *G09B 29/007* (2013.01); *G09B 5/125* (2013.01)

(58) Field of Classification Search
  CPC ........................................ A61B 5/00
  See application file for complete search history.

(56) References Cited

U.S. PATENT DOCUMENTS

| | | | | |
|---|---|---|---|---|
| 2014/0135631 A1* | 5/2014 | Brumback | ......... | A61B 5/02438 600/479 |
| 2014/0278064 A1* | 9/2014 | Lee | ........................ | G01C 21/34 701/428 |
| 2014/0347289 A1* | 11/2014 | Suh | ........................ | G06F 3/017 345/173 |
| 2014/0358483 A1* | 12/2014 | da Rosa | ................. | A01K 97/00 702/188 |
| 2015/0057929 A1* | 2/2015 | Bailey | .................... | G08C 17/02 701/526 |
| 2015/0057968 A1* | 2/2015 | Bailey | .................... | G08C 17/02 702/150 |

\* cited by examiner

*Primary Examiner* — Bruk Gebremichael
(74) *Attorney, Agent, or Firm* — John L. Sotomayor

(57) ABSTRACT

The present invention is a method and system of determining and collecting data such as, location, weather, temperature, and time to users of a mobile devices. Mobile devices such as smart phones, tablets, internet computers, and other hand held mobile devices may be ideal for tracking historical data based upon a user's activities and previous locations. The affiliations are determined based upon travel of wearable devices as tracked by Internet services and activation of the system by the user. In one example, the user may tap the wearable device causing a software system to analyze data associated to locations and conditions visited by the user. Furthermore, the system may even be enhanced by use of features tailored to train the user on improving how they perform various hobbies such as fishing.

12 Claims, 12 Drawing Sheets

US 10,223,937 B2

WEARABLE SPORT FISHING SYSTEM AND METHOD

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Advances in wearable technology have benefitted all sectors of the marketplace, but appear to have the most impact on consumers who utilize a wearable device in pursuit of an activity. Entertainment activities have increasingly been a larger part of mobile device use due to gaming and the ability for users to connect over the internet for purposes of competition. The most frequent use of wearable devices related to recreation has been in the arena of video gaming where developers have created games pertaining to sporting events such as football and golf.

Mobile devices, such as tablets, iPads, internet capable watches, and other handheld mobile devices, provide functionality and access to technology to users as they move about in their daily lives by providing information about sports, news, or retail products. Consumers depend heavily upon smart phones and other mobile devices to keep track of personal data, communicate with colleagues, and for shopping. Traditionally, young adults have primarily used mobile devices for texting, downloading apps for entertainment, and locating the hottest spot for socializing. Since the introduction of mobile devices the growing trend has been toward networking and entertainment. With the advent of wearable devices such as the fitbit, wearable heart monitors, and other wearable devices coupled with software to provide consumers with the ability to record and analyze parameters associated with an activity, such as an entertainment activity, ease of use has become a major factor in the adoption of such devices in combination with analytic software for use with such devices.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
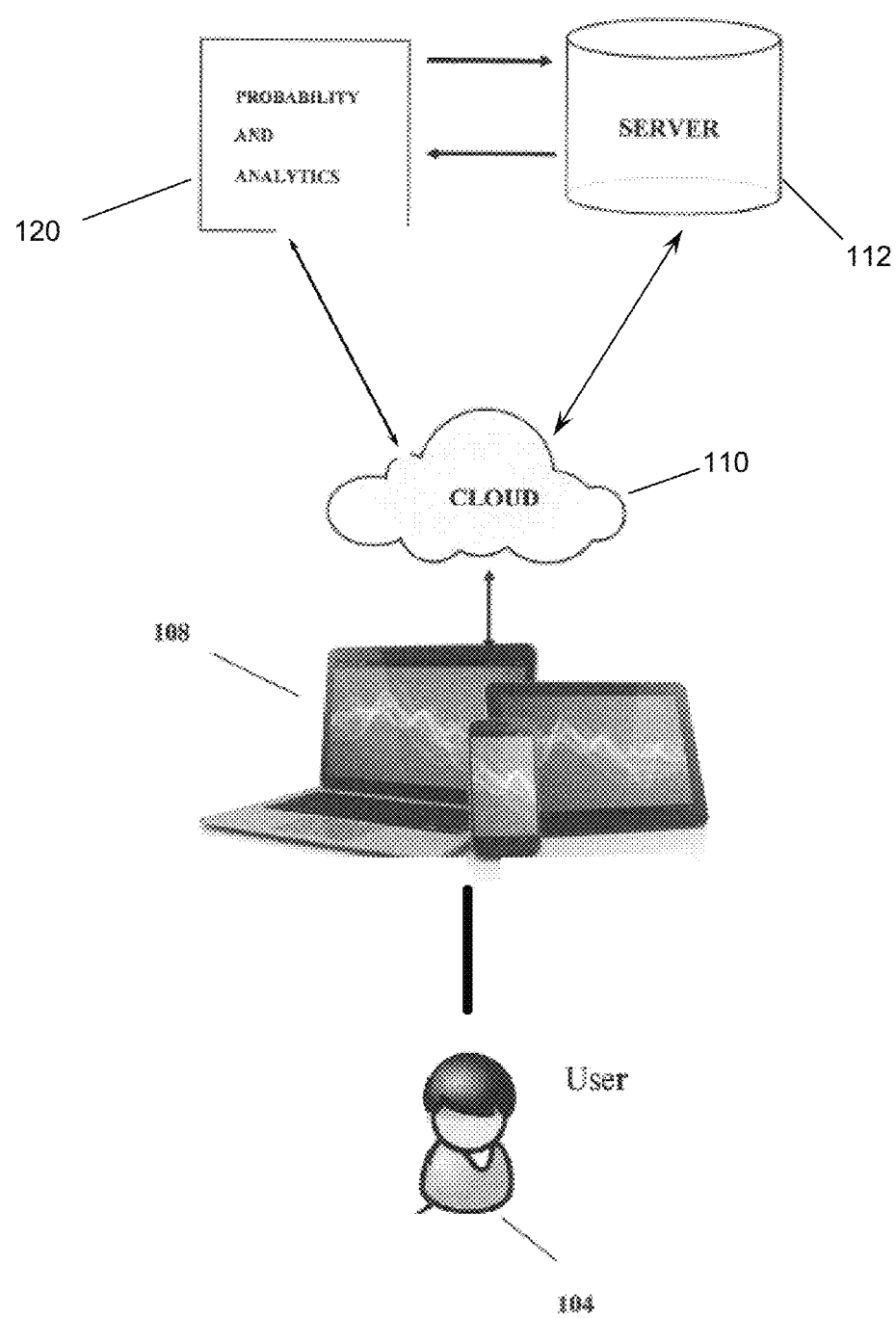
FIG. 1 is a system diagram for an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a mobile device refers to a variety of components that operates using any means of internet connection that transmits packets of data that allow smart devices (such as phones, tablets, computers, handheld devices, smart watches, electronic wrist band devices, game devices, etc.) to be updated when they receive data regarding the user's fishing activities.

In an embodiment, the Software application utilizes a wearable device such as a smart watch, armband such as a fitbit, or other wearable device that is connected to a mobile device such as computer, Android tablet, iPhone, or other mobile device. The wearable device is in contact with the mobile device whenever a synchronization event occurs. The wearable device may synchronize with a mobile device when it detects a mobile device in range. The wearable may then establish contact with the mobile device and transfer information to and from the mobile device. In an exemplary embodiment, activation of the data capture may be performed by interacting with the wearable device. The activation of the system and subsequent data capture may be through a single or double tap on an accessible surface, such as the integrated display, of the wearable device, through a gesture, shake, swipe, or any other action that may be captured by the wearable device or sensors in the wearable device that is configured as an activation signal. The software system installed on the mobile device may then activate and record certain data as initiated by the activation action performed by the user.

In this exemplary embodiment, the system utilizes the wearable device to connect with the software application stored on an iPhone, Android tablet, or computer as a reliable method to ensure that all collected data associated with the user's fishing events are stored and may be recalled at the user's convenience. Once the user initiates the system the wearable device captures all of the data in an instance and saves the captured data to a digital storage in a cloud-based service. Any cloud-based storage service may be configured to receive and store the data captured and created by the software application, such as, in a non-limiting example, Amazon web services. Any mobile device that the user configures to connect with the software application may have the capability to track and manage gathered data about the user's fishing trips and activities. In a non-limiting example, the application installed on the wearable device may display an image on which the user may perform the preconfigured activation action to initiate the software application and capture historical data. To facilitate analytical research regarding the use and location of the wearable device, information is compiled for each device through use of the software application on the desired mobile device.

In an initial embodiment, the software application may be configured to capture both automated and manual tracking information. Automated tracking information may be captured and stored simply based upon the activation action by the user on the wearable device. Such automated tracking information may include, but is not limited to date, trip time and distance, GPS tracking, outside temperature, wind speed and direction, moon phase and catch location. The software application may capture and save this information in one or more databases from which data may be retrieved by the user and enhanced with manual tracking information so as to not interfere with the fishing activities in which the user is engaged. The manual tracking information may include trip start and stop information, which is indicated by the user pressing a button on the wearable device or may be an automatic feature that initiates when the user begins to travel, fish marking, once again performed by the user pressing a button on the wearable device, recording a photo of the fish caught, which may be uploaded from camera images capture on a phone or tablet device, the species, weight, and length of a caught fish, which may be selected in a scroll option on the phone or table or may be manually entered as text, as well as the lure used to catch the fish. Additionally, the user may enter, either through a text option or utilizing a scroll option on a phone or tablet display, the water depth and temperature at the time of the catch. The software application may also have an offline mode and permit notifications to the user through the wearable device using tones or lights, or on the phone or tablet display.

In this embodiment, utilizing the tracking information provides highly accurate data for mobile device users to predict future chances of catching an increased number of fish. The more data collected from the surrounding conditions the more confident the mobile device can be about predicting the user's statistical odds of catching fish at a previous fishing site.

In an exemplary embodiment, the use of certain data and location points for predicting an user's chances of catching fish in locations previously visited will present an opportunity for an user to accurately track and identify critical locations where there is a high probability that fish are abundant by using a combination of mobile devices and application software systems. The confluence of time, location, temperature, and weather attributable to a known location by a user is a valuable set of information that may be captured through the use of both a wearable device and a software system that stores critical data for the user. The event in which a user visits a location for the purpose of fishing triggers the present invention to collect data.

In the exemplary embodiment, the characteristics of the wearable device and other user information associated with the mobile device may be determined and input manually by the user. The key factors of tracking and retrieving data manually may be configured by the user. This method of collecting data involves the use of existing data that the user retains in order to assist the software system to perform accurate predictions and/or keep an accurate record for other purposes. Additionally, the user may have full access to add and name locations, and retrieve records for edit functions such as add information, update existing information, or even delete the retrieved record. Furthermore, additional weather data that may be captured in future iterations of the current invention includes; barometric pressure, tide data for ocean locations, flow rate, and the application may even be automatically initiated if the application interprets that the wearable device has been located over a body of water for longer than a set period of time.

In an exemplary embodiment, software application server may utilize the information derived from the places where the user has previously visited for various purposes other than to accurately predict good fishing locations such as for tutorial purposes. The present invention may provide a method of sharing collected data from a fishing trip (e.g., amount of fish caught or geographic data relating to a user) may be accessible to social media users. Data used in this manner may come from a plurality of sources, such as a tutorial setting or a collection of audio. The user may also edit a variety of information (e.g., start/stop time, add/delete catches, and add trip locations). In an example, the add location feature allows users to draw a box around areas on a map and name locations. When any fish is caught within this area, it gets automatically tagged to that location. The system then can provide a report to show fish distribution. The system also has a memory cache when entering details that recalls fields from prior entries.

In an alternate embodiment, the present invention may include additional enhancement versions to the existing capabilities of the application software system. Users who desire to have their collected data tracked overtime can benefit from the various enhancements that the Software invention will offer. The ability to enhance data associated to the software system increases the ability of users to efficiently track their personal data. In a non-limiting example, the enhancements may track such data as weather, number of catches, number of casts through captured motion indicative of casting, fish species, river flow, fishing, forecast probability, and predictive analytics. Such enhancements will give the seasoned user the edge by providing critical data to make calculated decisions regarding what type of bait to use at which location. In a non-limiting example, the number of casts may also be captured automatically through the capture and analysis of pulse and heart rate data that may be indicative of a casting action. The pulse and heart rate data may also be combined with motion data to refine the indication of casting activity.

In an additional exemplary embodiment, the predictive feature of the system has an enhancement referred to as the premium version which allows the user to follow professional users by receiving information about what path the pros fished in a given body of water to permit the user to recreate the "Pro" experience. Additional features of the premium version of the system may include:

Subscriber Catch View—allow users to subscribe to see where fish are being caught.

Species Pin—instead of a pin marking the catch, have the type of fish display on the map as the pin in the location where that type of fish was caught.

Voice control catch details—allow user to use voice control to mark fish being caught and add other details which are then captured, converted to text, and added to the record for any particular catch.

Integrate Bait and Lure Database—find/create a bait and lure database to allow users to search for specific baits and/or lures to add to catches, such as, in a non-limiting example, providing access to the Bass Pro lure database.

Integrate Fish Species Database—find/create a fish species database to allow user to search and add fish species to catches when updated the catch record.

Multiple Language Integration—the software application and system may also provide additional language support for Spanish, Portuguese, Japanese, Italian, German, and any additional languages that may be requested by bodies of users.

Lure Training—vibration or sound in the watch that can be used to prompt the angler to make certain actions and train them how to fish various baits and lures.

State Research Portal—the application server may provide states and municipalities access to fishing data through a web portal to permit fishing authorities to compile more complete records concerning fish catches and fishing activity.

Fishing Condition Alerts—notifications will be sent to the user when there is a change in fishing conditions. These notifications will include change in weather conditions, tides, currents, solunar tables, and other factors based on data collected through the application.

Trip Path Arrows—add arrows on the trip path to show direction.

Trip Path Loop—create and provide a loop as a record of activity that may be reviewed so the user can watch how their trip transpired.

Automated Fight Tracking—recording of motion, heart rate, pulse, or sound to determine when an angler catches fish.

Keeper Tag—provide the ability for the angler to indicate whether the fish was a keeper or not. This is important for saltwater fishing.

The premium version of the system may also integrate additional data sources, such as tide charts and river water level data. This data may be recorded as part of the record to permit a user to know the tide information and river level information that existed when a fish was caught.

Based upon stored information about what a favorite pro recommends, users may research bait enhancements which permits a user to search for specific bait to add to their current collection. The system may even provide various databases of fish specifies for users to search and learn about rare fish as they are on the water way which will direct users to a specific body of water to catch a certain species of fish.

In an additional embodiment, the software application may be used as a training tool. The wearable unit may be capable of capturing and tracking certain motions of the user's extremities, heartrate, and also sounds that the user makes during certain activities associated to a hobby. This application allows increased options for the user to utilize which helps the user to become better at recreational activity. The data may also be used to build a rating score for each trip to assist the user improve on casting or endurance so as to become a better fisherman. This feature will not only highlight strengths but the user will also have the ability to analyze any weaknesses.

In an additional embodiment, data from multiple users may be captured and stored to form a user experience data base. The user experience data base may serve as an aggregation of all data from every user of the system. This aggregated data base may then be analyzed to determine trends, successful fishing locations, general data about trip duration and success rates, or any other data parameters that may form the basis of recommendations to users and provide some predictions and other indications to inform users as to where, when, and how best to catch fish.

Turning now to FIG. 1, this figure presents a system diagram for an exemplary system configuration consistent with certain embodiments of the present invention. A system for collecting a user's fishing site data 100. A wearable device may be worn by the user within a certain location such as on the ocean, sporting areas, parks, and any other similar location where information may be initially transmitted to a mobile device 108. The mobile device 108 may then aggregate the captured data from a single action, an entire trip, or multiple trips based upon user preference and transmit the captured data to one or more cloud-based storage systems 110. A user may initiate the software system by performing an activation action associated with the initiation of a wearable device 104. The activation action is important to permit the software application running in the wearable device to know when the user has signaled a catch, as opposed to when the wearable device was accidently touched or came into contact with the user inadvertently.

When the system is initiated, the wearable device 104 sends an initiation signal to the mobile device 108. The mobile device 108 may then capture location information from the wearable device 104 and capture environmental conditions from public data stores and transmit this information to the application software server 112 through one or more cloud servers 110. The application software server 112 stores the transmitted information data in a database 120 containing all of the collected data from the wearable device, either automatically by the software application and system when the user activates the wearable device or as an update to an entry already stored in the system through retrieval of the catch record on a device having a display such as a smart phone or tablet. The application software server 112 also adds a catch view which allows users to subscribe to see where fish are being caught by other users. Additionally, data regarding the user's previous fishing performances and other metrics are stored on the application software server 112 into the database records for each catch and for each user, permitting the user to later retrieve the stored records for review and update. The information data in the database 120 may also aggregate all captured information data across multiple trips and for multiple users to provide a broader database against which probabilities may be calculated and recommendations created for the user.

Figure 2:
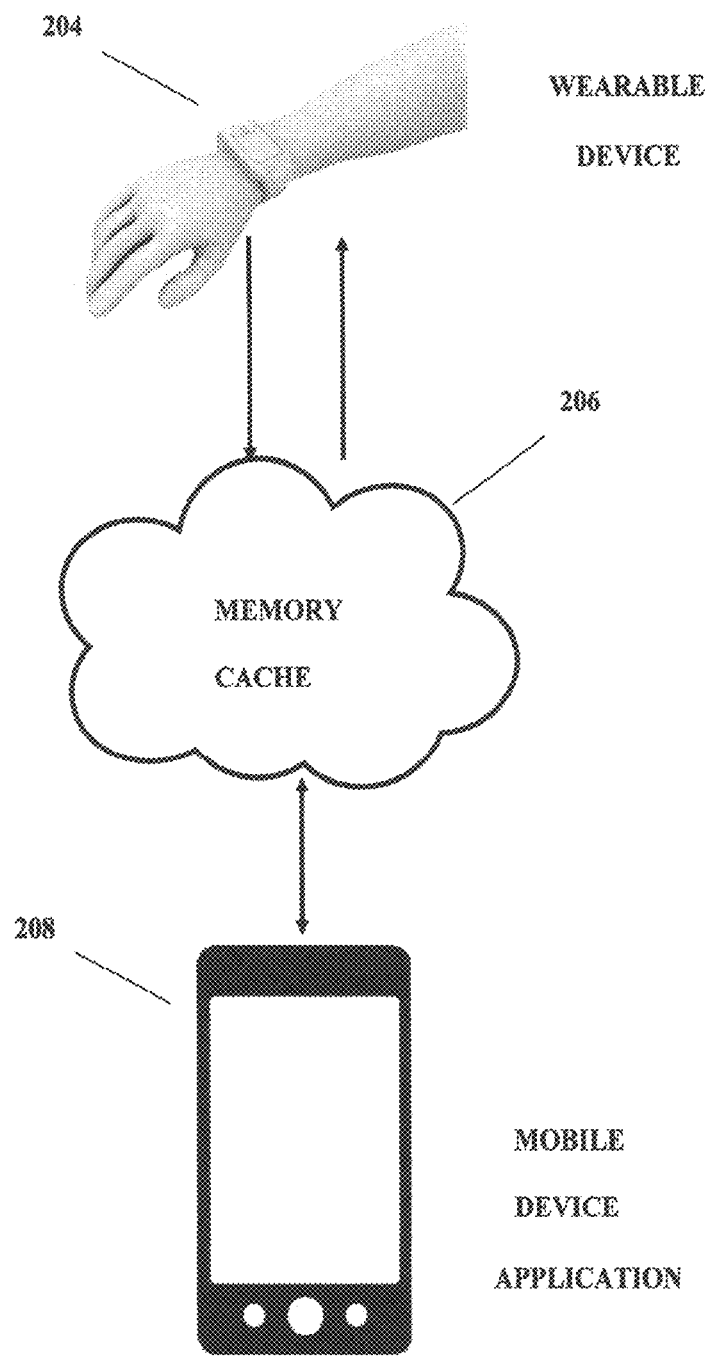
FIG. 2 is a system diagram for uploading location data onto a mobile device consistent with certain embodiments of the present invention.

Turning to FIG. 2, this figure presents a system diagram for an exemplary system configuration consistent with certain embodiments of the present invention. This figure presents a diagram for how a wearable device 204 captures data and stores data in a cache which collects data from the user's fishing sites. The collected data is submitted to a memory cache 206 and is maintained by a server. The memory cache 206 is an active component of a digital storage system that communicates with the mobile device 208 and analyzes critical data that is associated with the user. Each wearable device 204 may have multiple applications installed on the device 204 based upon a user's preferences. The installed application to each wearable device is connected to a digital database associated with the mobile device. The applications do not have to be active for the server to retrieve data but the device must be operational and manually initiated by the user in order for collected data such as a catch to be tracked by the software application and system installed on the mobile device. The system retrieves the information for the user's activities and displays the records of the collected data for the wearable device for the user to review, and information may be updated and stored for the owner or user of the mobile device to retrieve at a later date.

Figure 3:
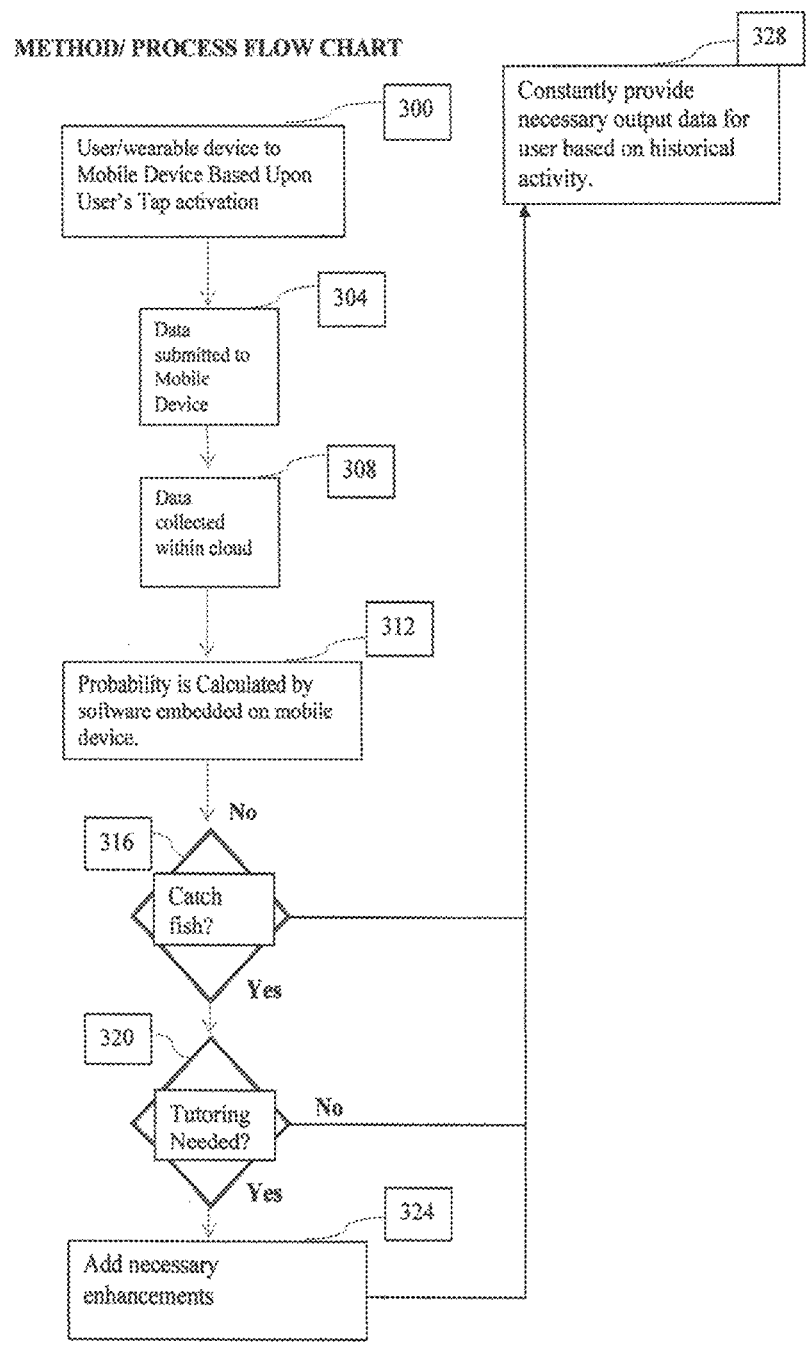
FIG. 3 is a process flow for the determination of critical data for the owner or user of a mobile device consistent with certain embodiments of the present invention.

Turning to FIG. 3, this figure presents a process flow for the determination of certain affiliations of the owner or user of a wearable device consistent with certain embodiments of the present invention. When a wearable device is initiated by the user's tap motion on the face of the wearable device at 300, the application on the wearable device will send collected data to a mobile device application. In a non-limiting example, the software application stored on the wearable device as well as the mobile device will keep track of all captured data.

At 304, the software application submits data to a configured mobile device for purposes of calculating the probability of certain characteristics for purposes of predicting certain affiliations. At 308, as an example, the system can also submit data to a digital storage in a cloud-based service such as Facebook, LinkedIn, Amazon, and other such service providers, may receive data regarding hobbies and preferences.

At 312, the software application has the capacity to analyze such data by utilizing all of the collected data from the wearable devices. The application may use algorithms known in the art to continually improve upon and optimize the output of each mobile device. As a non-limiting example assume a user and/or the wearable device is activated and properly operating for purposes of determining certain attributes of the user. Where data has been previously collected in certain locations, the software system may be used to determine the probability of a user's chances of catching fish but the system may calculate additional attributes for the user based on algorithms used in the software and a pre-configured timing patterns for updates and modifications to probabilities when calculated. In a non-limiting example, where a user has successfully caught several fish, using the software application permits the system to continue to perform calculations that utilizes data at each visit to ensure that the user improves his odds at each subsequent visit within a given location.

At 316, the user must alert the system of whether or not a fish has been caught by performing an activation action on the face of a wearable device, which triggers the application software system described above to perform calculation based on the triggering event and continual collected historical data by the system.

At 320, the software application allows the user to take advantage of training options to ensure that the user is not only receiving critical data but also improving their skills through information collected through previous activities by the user.

At 324, upon a user's request the software application may offer enhancements that include three different versions for the user that allows for increased tools and options for the proactive user who wish to stay ahead of their craft while staying in contact with social media and critical news.

At 328, the system will also continually collect datasets from the wearable device such weather conditions without being prompted by the user. This will allow the software application and system to maintain a multiphase approach to data collection to ensure an accurate prediction for the user. At 328, the system may fully track and maintain all data on the mobile server to allow proper operations and output for the user.

Figure 4:
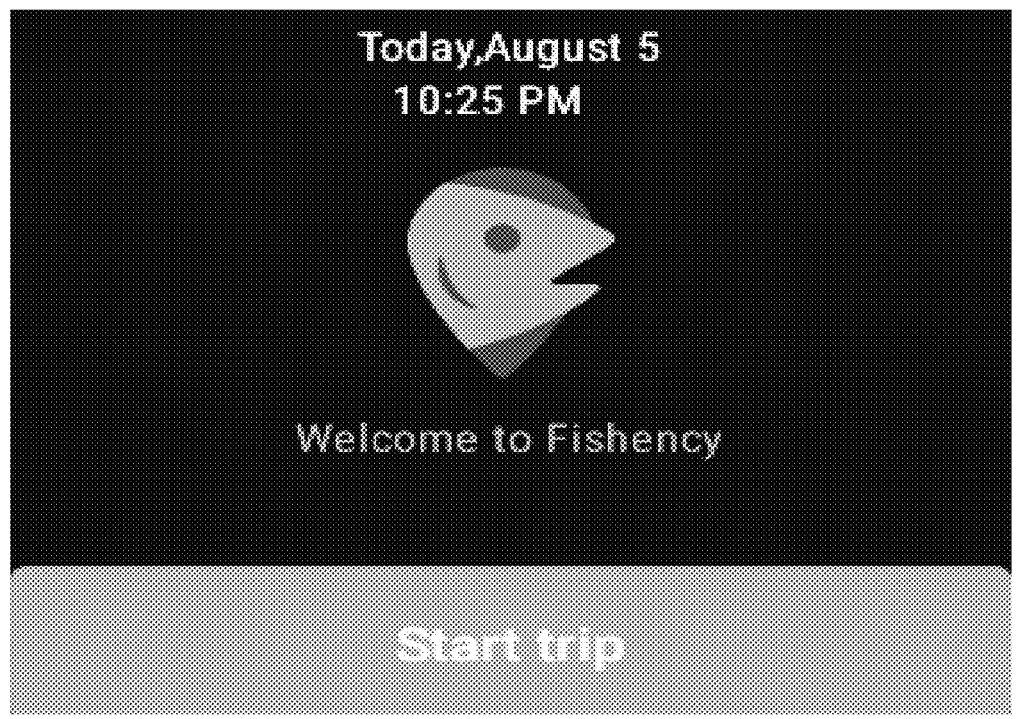
FIG. 4 is a view of a screen shot of the welcome display on the wearable device consistent with certain embodiments of the present invention.

Turning now to FIG. 4, this figure presents a screen shot of an initial display on the display surface of a wearable device associated with the software application and system consistent with certain embodiments of the present invention. This display presents an icon representative of the action to be captured by the software application and a legend welcoming the user. The display may be configured to show any initialization icon, text, or animation available to the user from the pre-configured setup maintained by the software application and supplied to the user as part of the initial configuration of the software application. In this non-limiting example, the user may be presented with a default configuration that consists of the date and time, an icon representative of the software application, a welcome message and a touch bar to permit the user to tap once to begin a fishing trip. In an alternative embodiment, the touch bar may not be required as the software application may be configured to start a trip when the user's positional change indicates they are traveling out of a "home" area.

Figure 5:
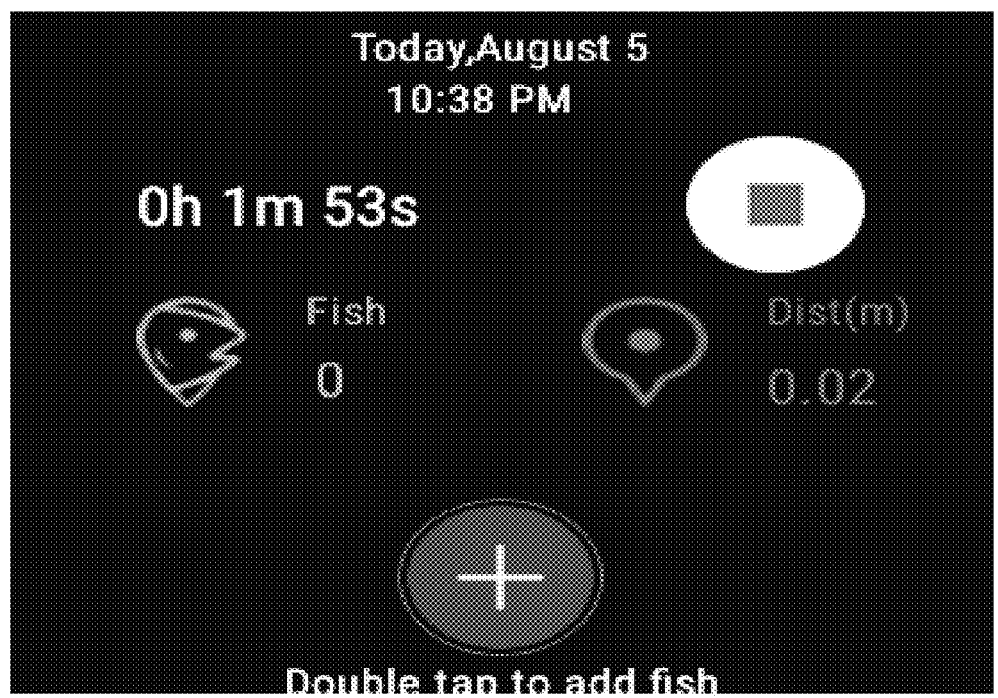
FIG. 5 is a view of a screen shot of the initial data display on the wearable device consistent with certain embodiments of the present invention.

Turning now to FIG. 5, this figure presents a screen shot of the initial action on the display surface of a wearable device associated with the software application and system consistent with certain embodiments of the present invention. In this exemplary embodiment, the user is presented with basic data about the trip underway, which is configurable by the user. In a non-limiting example, this information for a particular user may include duration, distance, fish caught, date and time. The display also provides the user with the instruction as to how to activate the catch data collection process of the software application. The user is provided with the instruction perform an activation action associated with the wearable device to add a fish when one is caught. This permits the software application to open a record and record basic information such as the date, time, geographic position, and other latent data previously described while permitting the user to continue to fish. The captured data is stored in a record in a cloud-based storage service for later retrieval and update by the user.

Figure 6:
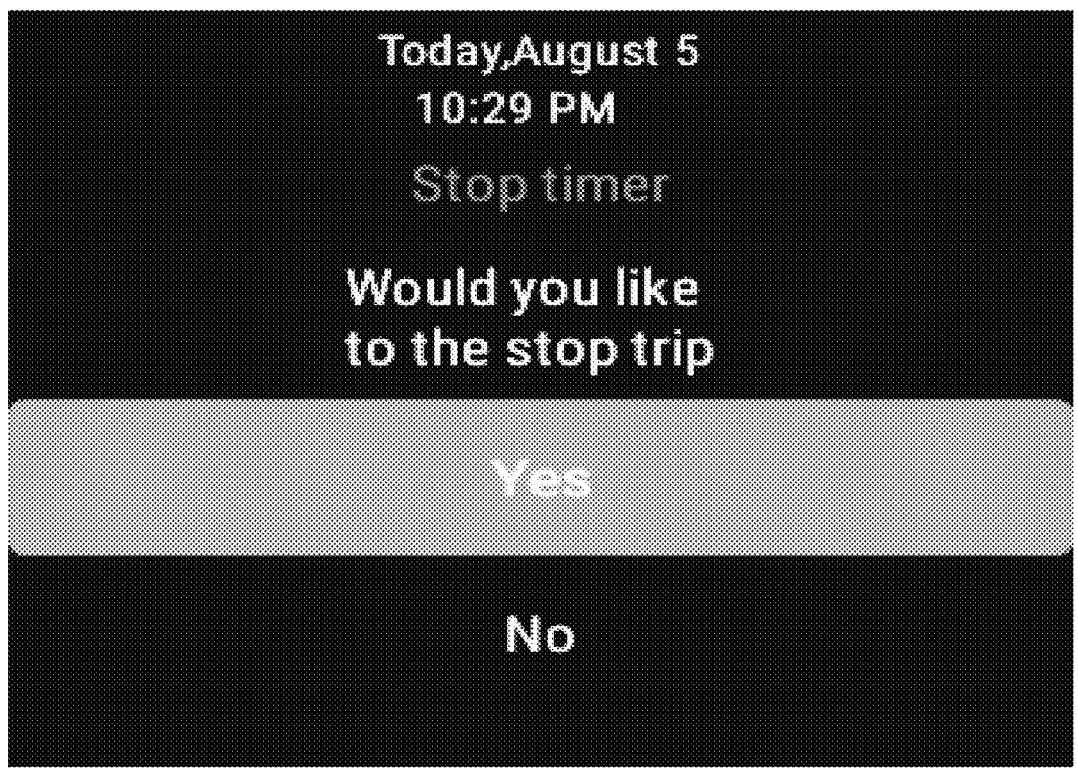
FIG. 6 is a view of a screen shot of the welcome display on the wearable device consistent with certain embodiments of the present invention.

Turning now to FIG. 6, this figure presents a screen shot of the command stop screen on the wearable device consistent with certain embodiments of the present invention. In an exemplary embodiment, the user may be presented with a stop trip screen when one or more trigger events are detected. These trigger events may include returning to the GPS coordinates of the trip starting point, remaining over land in the same spot for longer than a pre-configured period of time, or when the software application detects that the user has been motionless and inactive for longer than a pre-configured amount of time whether the user is on land or over water. Additional trigger events may be defined and configured by a user and be used to activate the command stop screen.

When a trigger event occurs, the wearable device displays a screen to the user to permit them to choose whether to stop the trip or continue. The user need simply tap a "yes" icon to stop the software application from recording additional records and to permit the software application to append a notification to the record that the trip was stopped by the user at the date and time the user selected the "yes" icon. If the user instead wishes to continue the trip, they simply tap the "no" icon, and the software application continues logging and recording information.

Figure 7:
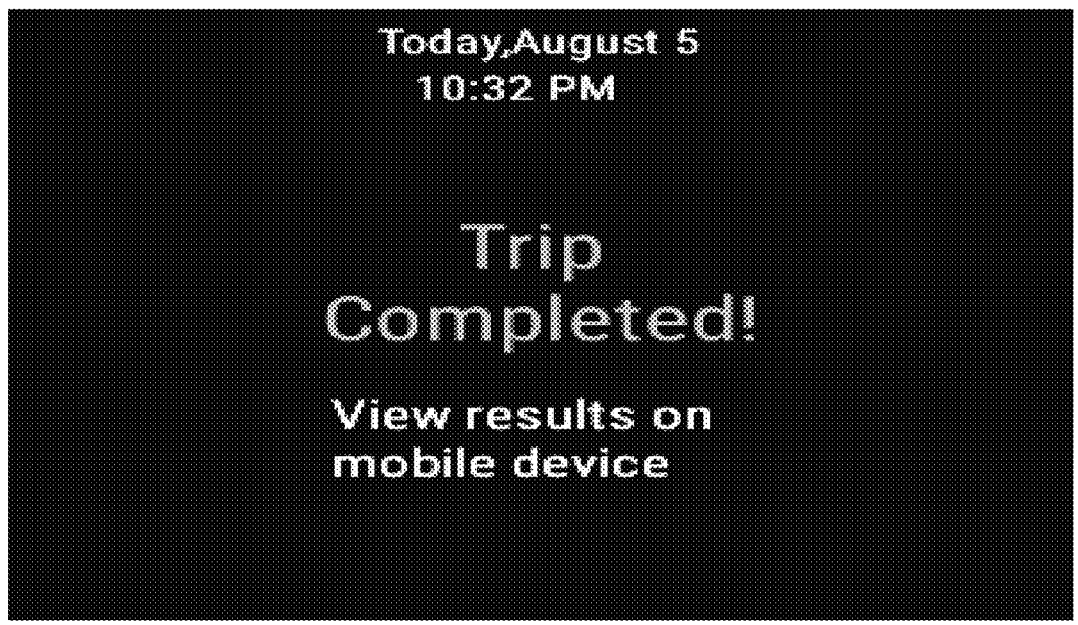
FIG. 7 is a view of a screen shot of the trip completion display on the wearable device consistent with certain embodiments of the present invention.

Turning now to FIG. 7, this figure presents a screen shot of the trip complete screen consistent with certain embodiments of the present invention. In this exemplary embodiment, it is important for the user to have a verification that the trip has ended, and that logging and record creation are complete for any particular fishing trip. Upon selection of the trip complete indication, or upon reaching a configurable period of time with no activity, the software application may present the user with this verification. The verification may take the form of a screen display on the wearable device stating that the trip has been completed, and indicate to the user that results of the trip may be viewed on the display of a network connected mobile device, such as a smart phone, iPad, tablet, or network computer. Additional messages may be provided to the user based upon the configuration of the system software. Such messages may include the date and time or other information that the user may find useful, such as, in a non-limiting example, the number of fish caught on a trip. Regardless of the information provided on this screen display, the user has been notified that the fishing trip logging and record creation has been stopped and the trip will be treated as a completed trip by the system.

Figure 8:
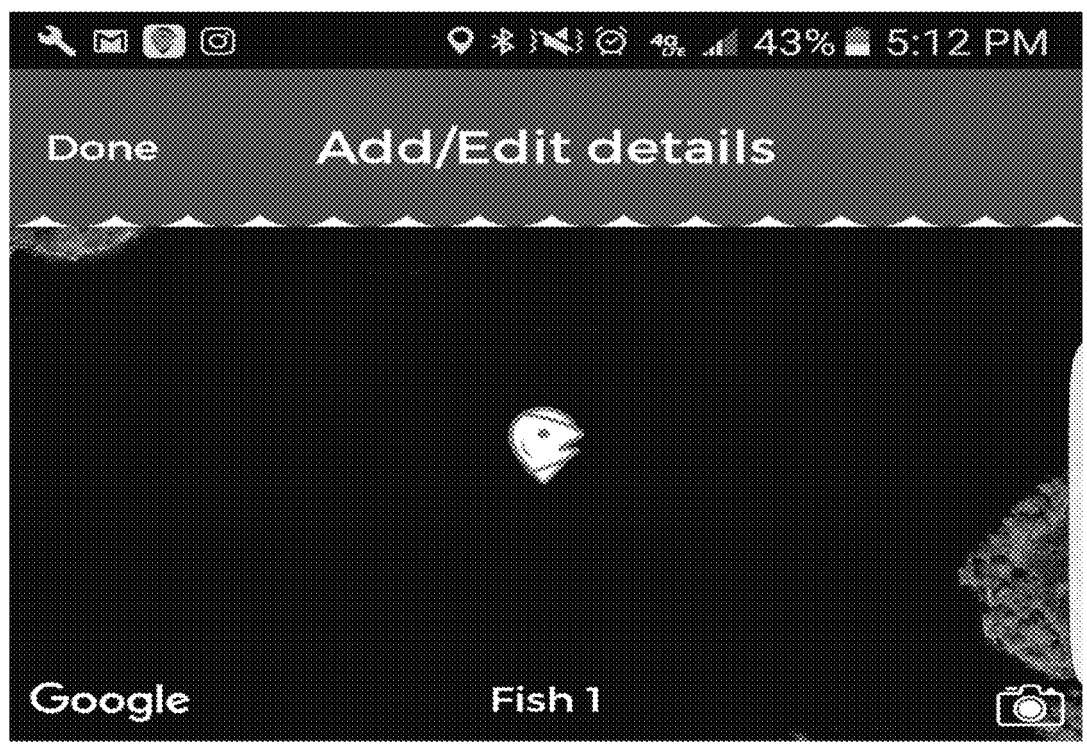
FIG. 8 is a view of a screen shot of the add/edit fish capture display on the mobile device consistent with certain embodiments of the present invention.

Turning now to FIG. 8, this figure presents a screen shot of the edit screen for adding catch information to a stored record after retrieval consistent with certain embodiments of the present invention. In this exemplary embodiment, after the capture of information when a fish is caught, an information record is created in the offline storage repository, such as a cloud-based storage service. When the user has time, after a catch has been secured, the user may retrieve the record from the cloud-based storage service to enter information about the fish caught. The user may then be presented with a map of the location of where the fish was caught and an icon representing the fish on the specific catch location on the map. The user may also be presented with empty text fields into which the user may enter information about the fish caught and conditions surrounding the catch. The fields presented to the user may be pre-configured to permit the user to enter information the user finds most relevant to the catch experience. In a non-limiting example, the user may choose to enter information about the species of fish caught, what bait and bait color were used, details about the fish such as weight and length, and information about conditions such as water depth and water temperature at the time of the catch. Again, these fields a simply an example of the types of fields a user may configure on the screen to capture information the user finds relevant or useful. Other fields may be configured to be presented as the default view based upon the user's preferences.

Figure 9:
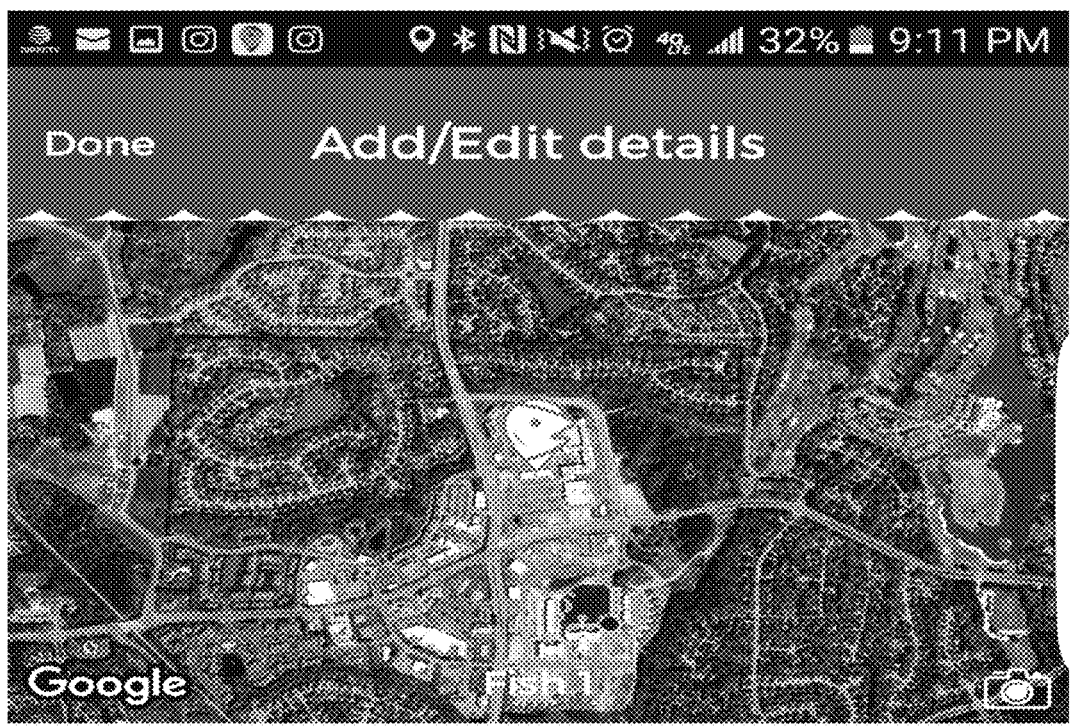
FIG. 9 is a view of a screen shot of the map and location data for a fish capture display on the mobile device consistent with certain embodiments of the present invention.

Turning now to FIG. 9, this figure presents a screen shot of the edit screen for updating a stored record after retrieval consistent with certain embodiments of the present invention. After the capture of one or more fishing trip records, the user may retrieve the record from the offline storage repository to review the record and update or edit details of the record. The data captured and stored in the record may be viewed on a display screen of a device such as a smart phone, tablet, iPad, or other network capable mobile device. In this non-limiting example, a record may contain a number of icons, maps, text records, or other information that may be viewed by the user. The data to be displayed may be configured by the user to be that data the user finds most valuable to record for later review and use. In this non-limiting example, a user may configure the system to display a map of the location where the fish was caught, an icon representing the fish species, geographic coordinates, date and time of the catch, meteorological data such as weather conditions, temperature and windspeed, and the distance traveled to reach the catch point. Any of this information may be updated by the user. The software application permits the user to add or modify data, update and save, and even delete the information record.

Figure 10:
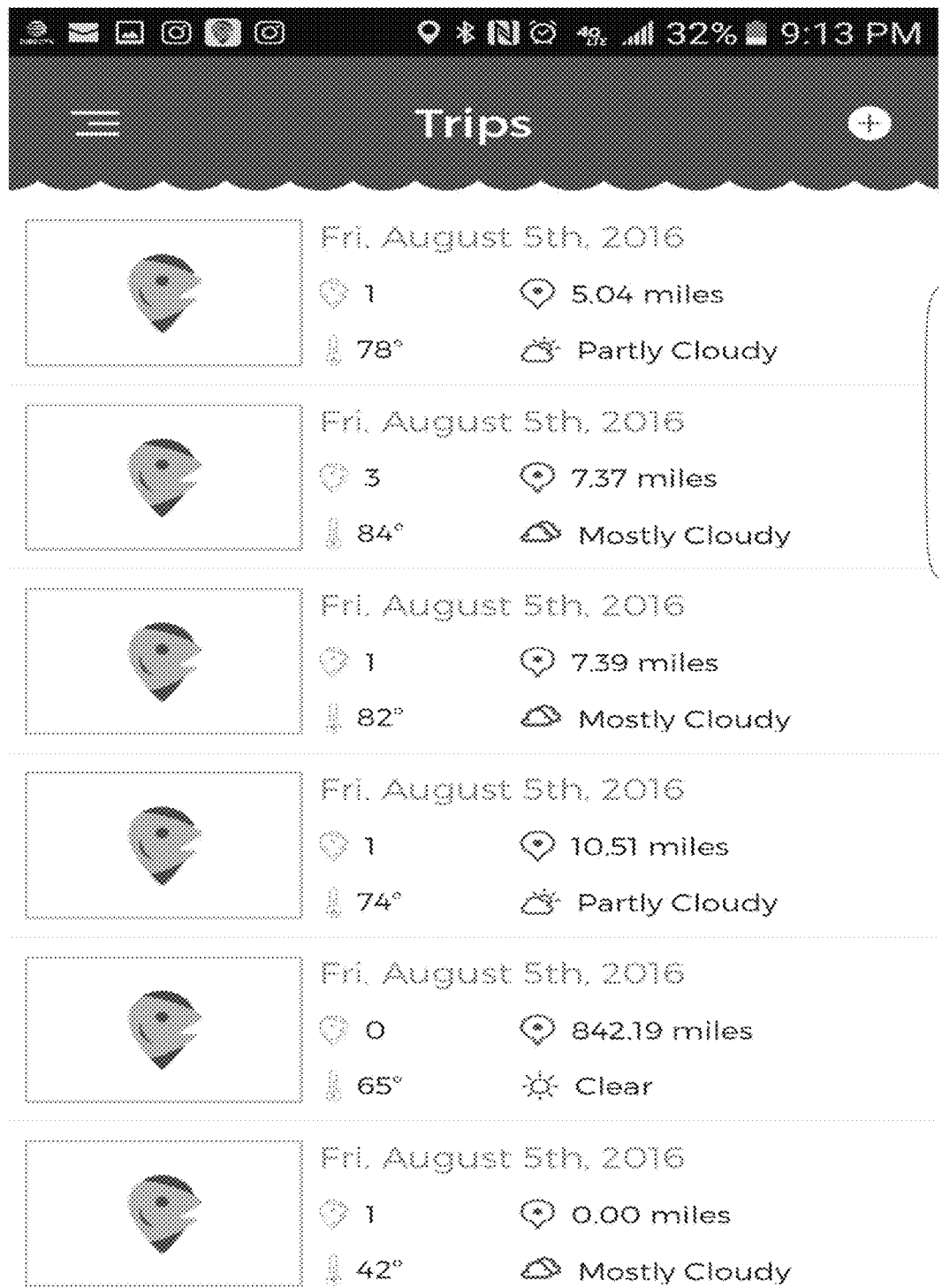
FIG. 10 is a view of a screen shot of the compiled trip display on the mobile device consistent with certain embodiments of the present invention.

Turning now to FIG. 10, this figure presents a screen shot of the trip screen for stored catch records consistent with certain embodiments of the present invention. In this exemplary embodiment, the trip record may contain a number of records for fishing trips and the fish caught on each trip. The record may contain a header that shows the fish species in icon form, the date of each trip, how many fish were caught on that trip, distance traveled to a catch site, and some weather information such as temperature and cloud conditions during the trip. As in previous record configurations, the data fields are fully configurable to present the user with information about each trip that the user will find most useful when glancing at the trip screen as presented on the display of a mobile device such as a smart phone, tablet, iPad or other network connected mobile device.

Figure 11:
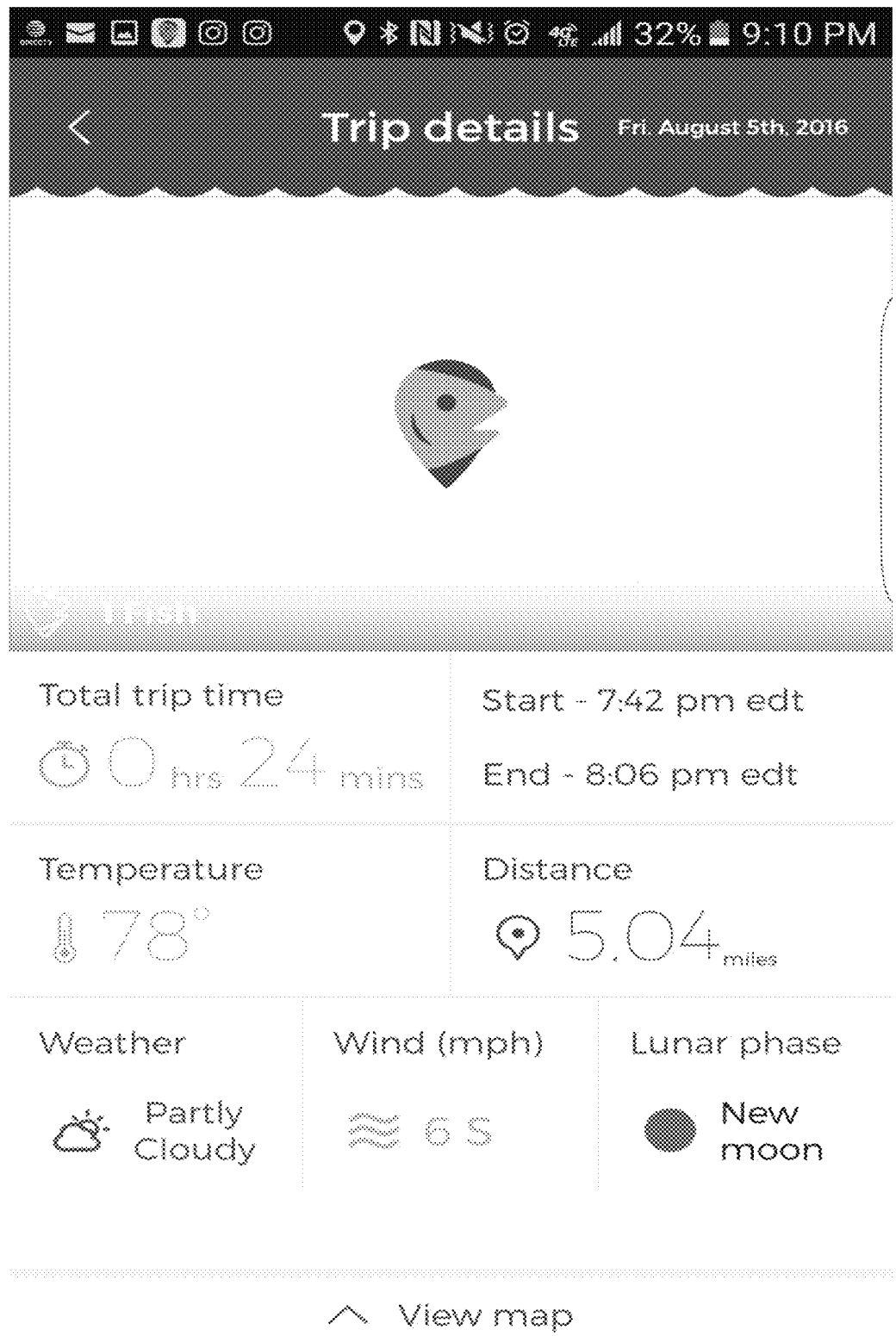
FIG. 11 is a view of a screen shot of the extended trip detail display on the mobile device consistent with certain embodiments of the present invention.

Turning now to FIG. 11, this figure presents a screen shot of the trip detail screen for viewing the stored record details after retrieval consistent with certain embodiments of the present invention. In this exemplary embodiment, upon selection of the trip screen, the user may wish to review additional or more detailed information about each fishing trip. The user may then select a record from the trip screen on the smart phone, iPad, tablet, or other mobile device and the software application may then retrieve the detailed trip record from the storage repository. The detailed record may provide the user with any and/or all detailed information about the trip selected. In a non-limiting example, the user may be presented with information about trip timing, such as start, stop, and duration of the trip, distance traveled, more detailed meteorological data, and the fish species and number caught. Additional trip details may be presented based upon the configuration of information that a user finds most useful. The record may be presented to the user upon selection of the trip record, and may be used in the aggregation of information about fishing trips taken by the user.

Figure 12:
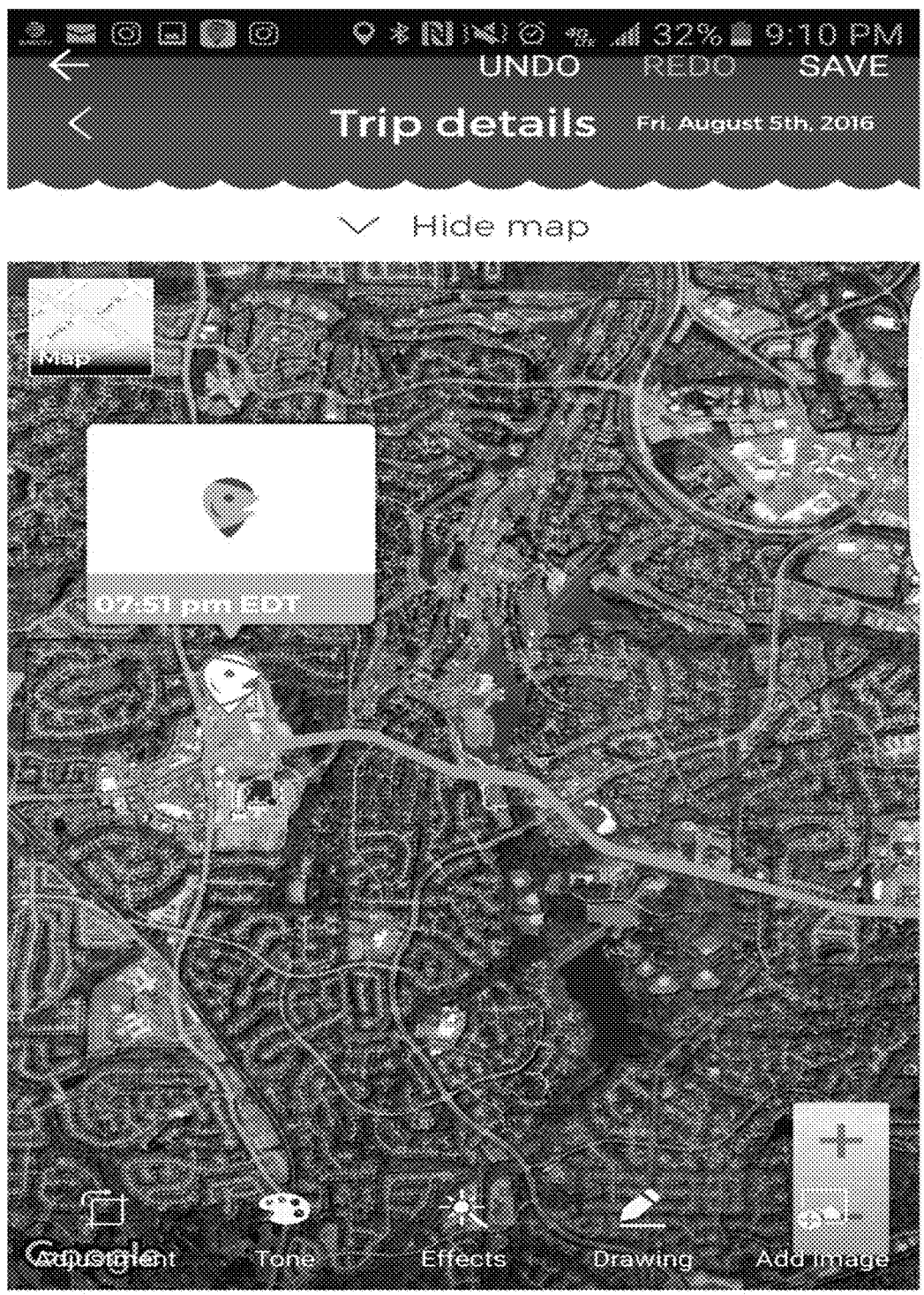
FIG. 12 is a view of a screen shot of the map location for each fish capture display on the mobile device consistent with certain embodiments of the present invention.

Turning now to FIG. 12, this figure presents a screen shot of the map of a trip consistent with certain embodiments of the present invention. In this exemplary embodiment, the user may be presented with a larger and more detailed map as a portion of the trip details for any selected fishing trip. The map may contain one or more icons, such as a fish head, indicating the location and/or species of a fish caught on the selected fishing trip. The user may navigate over the map and select the one or more fish icons, whereupon a pop-up screen may become active to disclose information about the fish caught on that trip and at that particular site. In a non-limiting example, the user may select a fish icon and receive information about the species and time of catch for a fish at the location selected on the map. This information may permit the user to derive greater understanding of when fish are most likely to be caught, and where the user has had success in the past.

Figure 13:
FIG. 13 is a view of a screen shot of the aggregated fish capture display on the mobile device consistent with certain embodiments of the present invention.

Turning now to FIG. 13, this figure presents a screen shot of the catch aggregation map consistent with certain embodiments of the present invention. In an exemplary embodiment, the user may also retrieve a series of records from the storage repository about fishing trips and catches made during each trip. This information may be aggregated and presented to the user as a plurality of catch icons, such as fish icons, for each catch made over a plurality of fishing trips. The user may be requested to enter a span of time for which records are to be retrieved and aggregated. The software application may also present to the user specific time spans, such as "last 30 days", "this year", or other pre-configured time spans that will retrieve trip records for that time span by simply selecting the pre-configured time span. The information may be presented on a map and permit the user to, again, receive a pop-screen with catch information by simply selecting the catch icon on the map.

Figure 14:
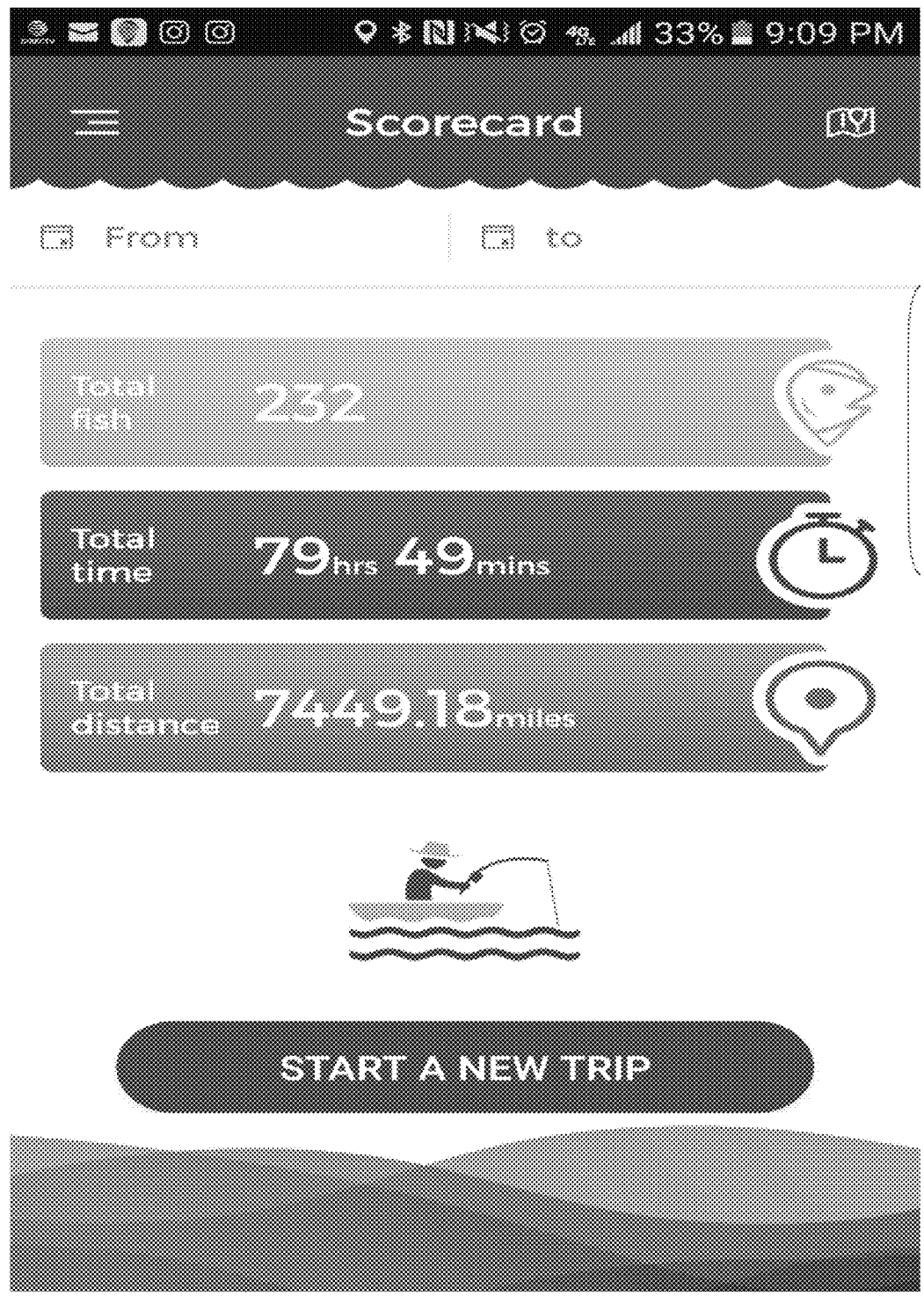
FIG. 14 is a view of a screen shot of the aggregated analytic fish capture display on the mobile device consistent with certain embodiments of the present invention.

Turning now to FIG. 14, this figure presents a screen shot of the activity scorecard for the user consistent with certain embodiments of the present invention. In this exemplary embodiment, the software application may analyze aggregated data compiled by the user over a number of fishing trips to create and display a scorecard. The score card may be used as a part of a training regimen for those users who wish to be competitive anglers and who will need to understand how to improve their performance on the water to become better anglers.

In this exemplary embodiment, the software application may collect additional information from the wearable device attached to the user. This additional information may include tracking the motion of the angler's arms, heartrate, and sound to track the number of casts the user makes during a fishing trip. This information may be presented to the user, as well as the total number of fish caught on a trip, to assist the user in understanding whether, and how, they are improving in their fishing efforts over time. The scorecard may present the user with the number of fish caught, the amount of time, and the amount of distance traveled in a non-limiting, default configuration, but may also be configured to present additional information to the user. The additional, or different, information may be configured by a user based upon the needs and desires of a user to improve their form, casting speed, and catch performance and may include additional analysis and metrics that are not herein represented but may be derived from the aggregated fishing records stored in the storage repository.

While certain illustrative embodiments have been described, it is evident that many alternatives, modifications, permutations and variations will become apparent to those skilled in the art in light of the foregoing description.

What is claimed is:

1. A system for collecting data regarding a user's activity comprising:
 a wearable device having a processor and capable of transmitting and receiving data communications;
 said wearable device establishing and synchronizing data communication with a mobile device when said wearable device detects a mobile device in communication range;
 a system server in data communication with said wearable device and said mobile device;
 said user performing a double tap on an accessible surface of said wearable device and/or shaking said wearable device to activate the collection by said mobile device of a plurality of historical data points from the system server and collecting at least one available environmental, and time condition data sets for at least one geographic location from the system server;
 selecting a data set and displaying said data set on a map associated with said mobile device for a geographic location associated with said selected data set;
 initiating a system module embedded in the wearable device to capture tracking data for the user's actions from one or more sensors in said wearable device;
 saving said captured tracking data in digital storage in a cloud-based service;
 transmitting said captured tracking data from the wearable device to a cloud-based service associated with said system server and storing the captured tracking data into an electronic storage repository managed by the cloud-based service;
 enabling a user to interact with said collection of tracking and historical data as presented on a user interactive display available on said mobile device and in communication with said system server to enter into the user interactive display image data, species of fish, and method for catching fish;
 associating collected data to the system server through a reporting of collected metrics from each wearable device that is in continuous contact with the system server; and
 the system server delivering historical data to one or more mobile devices based upon the collected data points associated with each wearable device where the tracking and historical data provides a prediction for catching fish.

2. The system of claim 1, wherein said wearable device comprises any of a wristwatch, smart watch or exercise band in data communication with a mobile device.

3. The system of claim 2, wherein said wearable device receives preference data configured by the user.

4. The system of claim 1, wherein said system server performs an analysis of collected data to predict the probability of success in catching fish for the user.

5. The system of claim 4, further comprising providing collected information from said system server to provide tutorials to assist the user in understanding whether, and how, they are improving in their fishing efforts over time.

6. The system of claim 5, further comprising providing weather information, bait information, watch configuration, water depth, water temperature, photos of fish, analytics and environmental condition information related to a fishing activity to a user.

7. The system of claim 6, further comprising automated tracking of cast motions, heart rate, pulse, and sound data.

8. The system of claim 7, further comprising analyzing collected user data to create and provide probability recommendations for a successful catch for a given fishing location.

9. The system of claim 1, wherein said software system comprises providing a data communication connection to a digital storage repository utilizing said cloud-based service; and permitting the user to retrieve the data associated with a trip that corresponds to the user's activation based on the user's activation of the system through tapping, shaking and/or pressing a button associated with the wearable device.

10. A method of processing collected data comprising:

a user performing a double tap on an accessible surface of a wearable device and/or shaking said wearable device as an initiation action to activate the collection by a mobile device of a plurality of historical data points from a system server and collecting at least one available environmental, and time condition data sets for at least one geographic location from the system server;

the tapping and/or shaking on said wearable device triggering the automatic collection of data by said system server in association with said geographic location and delivering said collection of data to a mobile device associated with said wearable device;

initiating a system module embedded in the wearable device to capture tracking data for the user's actions from one or more sensors in said wearable device;

saving said captured tracking data in a digital database associated with the mobile device;

transmitting said captured tracking data from the wearable device to a cloud-based service associated with said system server and storing the captured tracking data into an electronic storage repository managed by the cloud-based service;

enabling a user to interact with said collection of data associated with said wearable device to enter into a user interactive display presented on an additional connected mobile device images, species of fish, and methods for catching fish;

a user retrieving one or more data records stored on the wearable device to be transmitted to said system server for storage and later retrieval; and where the collected tracking and historical data is analyzed within said system server and used to provide statistical outputs from the system server to said mobile device to provide a prediction to the user of said user's chances of successfully catching fish in a given location.

11. The method recited in claim 10, further comprising said wearable device providing notifications to the user through the wearable device using tones or lights.

12. The method of claim 10, further comprising providing collected information from said system server regarding the operation of the wearable device to provide tutorials to assist the user in understanding whether, and how, they are improving in their fishing efforts over time.

* * * * *